United States Patent
Van Bekkum et al.

(10) Patent No.: US 10,267,697 B2
(45) Date of Patent: Apr. 23, 2019

(54) APPARATUS AND METHOD FOR WIRE LENGTH COMPENSATION IN SERVO GAUGE FOR INVENTORY MANAGEMENT APPLICATION

(71) Applicant: Honeywell International Inc., Morris Plains, NJ (US)

(72) Inventors: Frank Van Bekkum, Bergschenhoek (NL); Ronald Schrier, Delft (NL)

(73) Assignee: Honeywell International Inc., Morris Plains, NJ (US)

( * ) Notice: Subject to any disclaimer, the term of this patent is extended or adjusted under 35 U.S.C. 154(b) by 272 days.

(21) Appl. No.: 15/254,693

(22) Filed: Sep. 1, 2016

(65) Prior Publication Data

US 2018/0058960 A1    Mar. 1, 2018

(51) Int. Cl.
| | |
|---|---|
| *G01F 25/00* | (2006.01) |
| *G01L 5/10* | (2006.01) |
| *G01L 25/00* | (2006.01) |
| *G01F 23/00* | (2006.01) |
| *G01F 23/22* | (2006.01) |

(52) U.S. Cl.
CPC ............ *G01L 5/10* (2013.01); *G01F 23/0023* (2013.01); *G01F 23/22* (2013.01); *G01L 25/00* (2013.01); *G01F 25/0061* (2013.01)

(58) Field of Classification Search
CPC ............................ G01L 25/00; G01F 25/0069
USPC .... 73/1.08, 1.73, 1.79, 1.81, 305–316, 32 R, 73/437, 440, 444–453, 61.51
See application file for complete search history.

(56) References Cited

U.S. PATENT DOCUMENTS

| | | | | |
|---|---|---|---|---|
| 2,758,474 A | * | 8/1956 | McKinney | .......... G01F 23/0023 340/870.38 |
| 4,244,219 A | * | 1/1981 | Takahashi | ............. G01F 23/443 318/482 |

(Continued)

FOREIGN PATENT DOCUMENTS

| | | | |
|---|---|---|---|
| JP | 357118121 | * | 7/1982 |
| KR | 101371049 | * | 3/2014 |

OTHER PUBLICATIONS

Van Bekkum, Frank, "Density Compensation for Electromechanical Liquid Level Gauges", U.S. Appl. No. 14/875,325, filed Oct. 5, 2015.

(Continued)

*Primary Examiner* — Robert R Raevis

(57) ABSTRACT

A method includes measuring tensions on a measuring wire coupled to a displacer of a servo gauge. The servo gauge is configured to raise and lower the displacer using a drum around which the measuring wire is wound. Different measured tensions are associated with different segments of the measuring wire. The method also includes calculating or adjusting a measurement associated with material in a tank using the measured tensions to account for a change in a length of the measuring wire. Calculating or adjusting the measurement could include calculating one or more first length adjustments for one or more segments of the measuring wire that are wound around the drum, calculating one or more second length adjustments for one or more other segments of the measuring wire that are unwound from the drum, and combining the first and second length adjustments to identify a final length adjustment.

18 Claims, 5 Drawing Sheets

(56) References Cited

U.S. PATENT DOCUMENTS

| | | |
|---|---|---|
| 8,997,549 B2 | 4/2015 | Joosten et al. |
| 2013/0269432 A1* | 10/2013 | Brutschin ............... G01F 23/44 |
| | | 73/313 |
| 2014/0016126 A1 | 1/2014 | Versluijs et al. |
| 2014/0039816 A1 | 2/2014 | Van Bekkum |

OTHER PUBLICATIONS

Van Bekkum, Frank et al., "Automatic Pressure Correction for Level Gauges in Storage Tanks", U.S. Appl. No. 15/207,693, filed Jul. 12, 2016.

* cited by examiner

APPARATUS AND METHOD FOR WIRE LENGTH COMPENSATION IN SERVO GAUGE FOR INVENTORY MANAGEMENT APPLICATION

TECHNICAL FIELD

This disclosure relates generally to inventory management systems. More specifically, this disclosure relates to an apparatus and method for wire length compensation in a servo gauge for an inventory management application.

BACKGROUND

Processing facilities and other facilities routinely include tanks for storing liquid, solid, or other materials. For example, storage tanks are routinely used in tank farm facilities and other storage facilities to store oil or other materials. Processing facilities also often include tanks for implementing industrial processes. Storage tanks could include above-ground structures and below-ground structures.

Often times, it is necessary or desirable to measure the amount of material stored in a tank. This may be useful, for example, during loading of material into the tank or unloading of material from the tank or during liquid stock accounting. As a particular example, "legal metrology" often requires highly accurate measurements from level gauging instruments installed on the roof of a tank, such as during custody transfers or when levying taxes or duties. In bulk storage tanks, an error of one millimeter in a level reading can correspond to several cubic meters of volumetric error. This can result in losses of thousands of dollars for one or more parties. Moreover, this can have negative effects on stock reconciliation, which involves attempting to track where materials are located and how materials are lost.

Among other approaches, servo gauges have been used to measure the level of material in a tank. A servo gauge is an electro-mechanical type of automatic tank gauge that typically raises and lowers a displacer, which sinks in material within a tank. The servo gauge can determine the level of material in the tank based on changes in the displacer's apparent weight, which changes depending on (among other things) whether the displacer is hanging in the air or submerged in the material.

The displacer of a servo gauge is typically suspended by a thin yet very strong wire, which is often spooled on a grooved measuring drum. The servo gauge rotates the drum to raise and lower the displacer. By continuously measuring the apparent weight of the displacer, the servo gauge can sense whether the displacer is above, partially submerged, or fully submerged. The servo gauge may then attempt to keep the displacer at a fixed position relative to the surface of the material in the tank. By doing so, the servo gauge can calculate the material level in the tank based on the amount of wire spooled off the drum. It may also be possible for a servo gauge to measure the density of different layers of material (such as swater and oil) in a tank.

SUMMARY

This disclosure provides an apparatus and method for wire length compensation in a servo gauge for an inventory management application.

In a first embodiment, a method includes measuring tensions on a measuring wire coupled to a displacer of a servo gauge. The servo gauge is configured to raise and lower the displacer using a drum around which the measuring wire is wound. Different measured tensions are associated with different segments of the measuring wire. The method also includes calculating or adjusting a measurement associated with material in a tank using the measured tensions to account for a change in a length of the measuring wire.

In a second embodiment, an apparatus includes a drum configured to be rotated in order to raise and lower a displacer within a tank and a measuring wire coupling the drum and the displacer. The apparatus also includes a sensor configured to measure tensions on the measuring wire such that different measured tensions are associated with different segments of the measuring wire. The apparatus further includes a controller configured to calculate or adjust a measurement associated with material in the tank using the measured tensions to account for a change in a length of the measuring wire.

In a third embodiment, a non-transitory computer readable medium contains instructions that, when executed by at least one processor, cause the at least one processor to obtain tensions on a measuring wire coupled to a displacer of a servo gauge. The servo gauge is configured to raise and lower the displacer using a drum around which the measuring wire is wound. Different measured tensions are associated with different segments of the measuring wire. The medium also contains instructions that, when executed by the at least one processor, cause the at least one processor to calculate or adjust a measurement associated with material in a tank using the measured tensions to account for a change in a length of the measuring wire.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6C, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
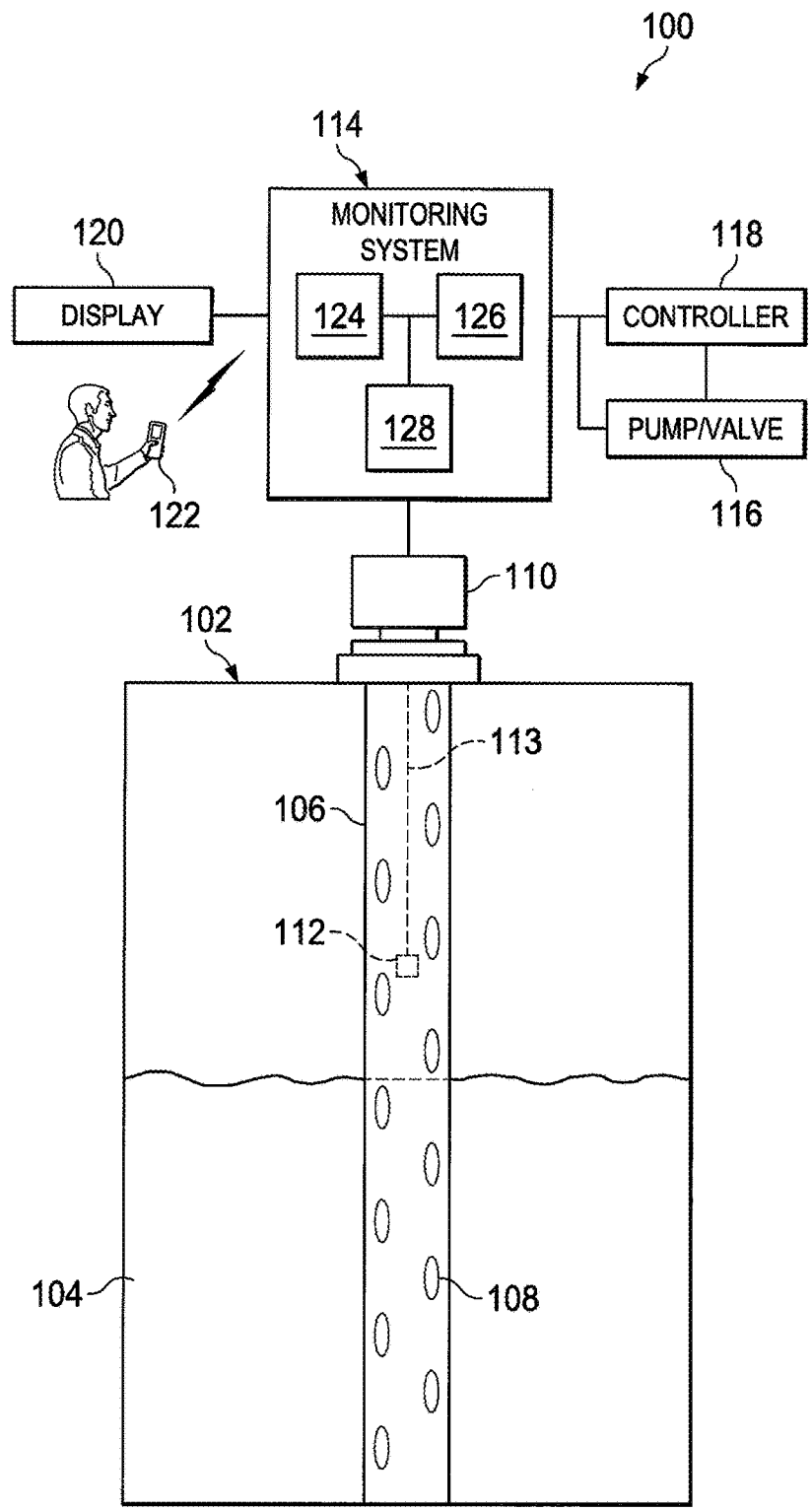
FIG. 1 illustrates an example inventory management system having a servo gauge according to this disclosure.

FIG. 1 illustrates an example inventory management system 100 having a servo gauge according to this disclosure. As shown in FIG. 1, the system 100 includes a tank 102 that can store one or more materials 104. The tank 102 represents any suitable structure for receiving and storing at least one liquid or other material. The tank 102 could, for example, represent an oil storage tank or a tank for storing other liquid(s) or other material(s). The tank 102 could also have any suitable shape and size. Further, the tank 102 could form part of a larger structure. The larger structure could represent any fixed or movable structure containing or associated with one or more tanks 102, such as a movable tanker vessel, railcar, or truck or a fixed tank farm.

A stillpipe 106 having multiple openings 108 could optionally be used in conjunction with a servo gauge 110 to facilitate the measurement of material 104 in the tank 102. The openings 108 represent holes, slots, or other apertures that allow material 104 to enter into and leave the stillpipe 106. The stillpipe 106 helps to provide a stable reference point for the servo gauge 110 to measure. For instance, the level of material 104 in the stillpipe 106 is generally equal to the level of material 104 outside the stillpipe 106, but the stillpipe 106 helps to reduce or prevent waves or other disturbances to the material 104 outside the stillpipe 106 from affecting level measurements taken inside the stillpipe 106 by the servo gauge 110. The stillpipe 106 includes any suitable structure for receiving material and allowing material measurements within the stillpipe. The stillpipe 106 can also be located at any suitable position. For instance, the stillpipe 106 could be attached to the tank's roof, floor, or an upper or lower portion of the tank's shell. Note, however, that the use of the stillpipe 106 is optional and that the servo gauge 110 could operate inside the tank 102 in free space without the use of a stillpipe.

The servo gauge 110 includes a displacer 112 that is physically raised and lowered within the tank 102 using a measuring wire 113. The displacer 112 can sink in the material 104 in the tank 102. The apparent weight of the displacer 112 (actual weight minus buoyancy) varies depending on whether the displacer 112 is completely or partially submerged and the type of material in which the displacer 112 is submerged. The servo gauge 110 could use the apparent weight of the displacer 112 to identify the level of material 104 in the tank 102. For example, the servo gauge 110 can raise and lower the displacer 112 using the measuring wire 113 wrapped around a drum, and the servo gauge 110 can measure the torque or other force on the drum or a structure coupled to the drum (such as a shaft). The servo gauge 110 can use the measured force to determine when the displacer 112 has become completely or partially submerged in the material 104, allowing the servo gauge 110 to determine the surface level of the material 104 in the tank 102. Similar operations could be used by the servo gauge 110 to identify different layers of material 104 in the tank 102 since the apparent weight of the displacer 112 can vary depending on the type of material in which it is submerged. For instance, the servo gauge 110 could be used to identify where an interface exists between water and one or more oil products in the tank 102. The servo gauge 110 could further be used to identify a density of one or more materials in the tank 102 since the density of material can affect the apparent weight of the displacer 112. The servo gauge 110 includes any suitable structure for measuring one or more characteristics of material in a tank using a displacer.

With respect to level measurements (such as surface level measurements and material interface measurements), the level measurements could take various forms, such as absolute or relative measurements. Absolute level measurements could denote distances between the surface of the material 104 or a material interface and the bottom of the tank 102. Relative level measurements could denote distances between the top of the material 104 or a material interface and a reference location, such as a reference location known to the servo gauge 110.

The determined characteristic(s) of the material 104 can be provided from the servo gauge 110 to a monitoring system 114 over a wired or wireless link. The monitoring system 114 can use the determined characteristic(s) from the servo gauge 110 in any suitable manner. For example, the monitoring system 114 could control automatic loading or unloading of material in the tank 102 by controlling a pump or valve 116 or by providing the determined level to an external controller 118 that controls the pump or valve 116. The monitoring system 114 could also notify personnel responsible for controlling the loading or unloading of the tank 102, such as by displaying the determined level on a display 120 or by transmitting the determined level to a wireless or other user device 122. The monitoring system 114 could further trigger any suitable alarm, such as when the servo gauge 110 detects a leak or overfill in the tank 102 based on the identified level or other measurements.

The monitoring system 114 represents any suitable computing or processing system or device, such as a computing device or an industrial process controller. In particular embodiments, the monitoring system 114 includes at least one processing device 124 and at least one memory 126 storing instructions and data used, generated, or collected by the processing device(s) 124. The monitoring system 114 can also include at least one interface 128 facilitating communication with external devices or systems like the components 110 and 116-122, such as an Ethernet interface, a radio frequency (RF) transceiver, or other wired or wireless interface.

Figure 2:
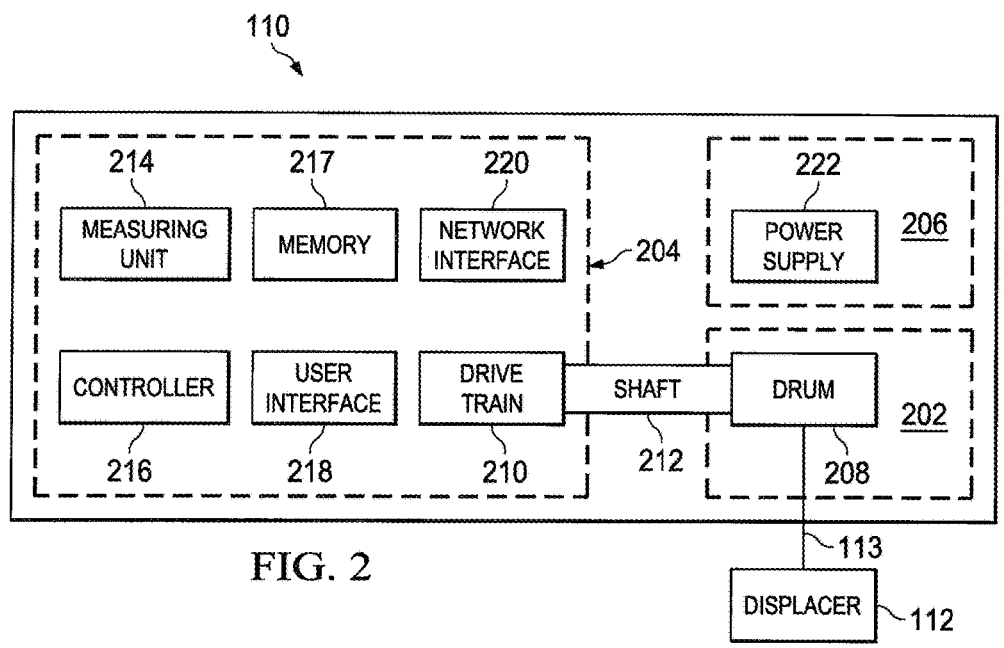
FIGS. 2 and 3 illustrate example servo gauges for use in an inventory management system according to this disclosure.
Figure 3:
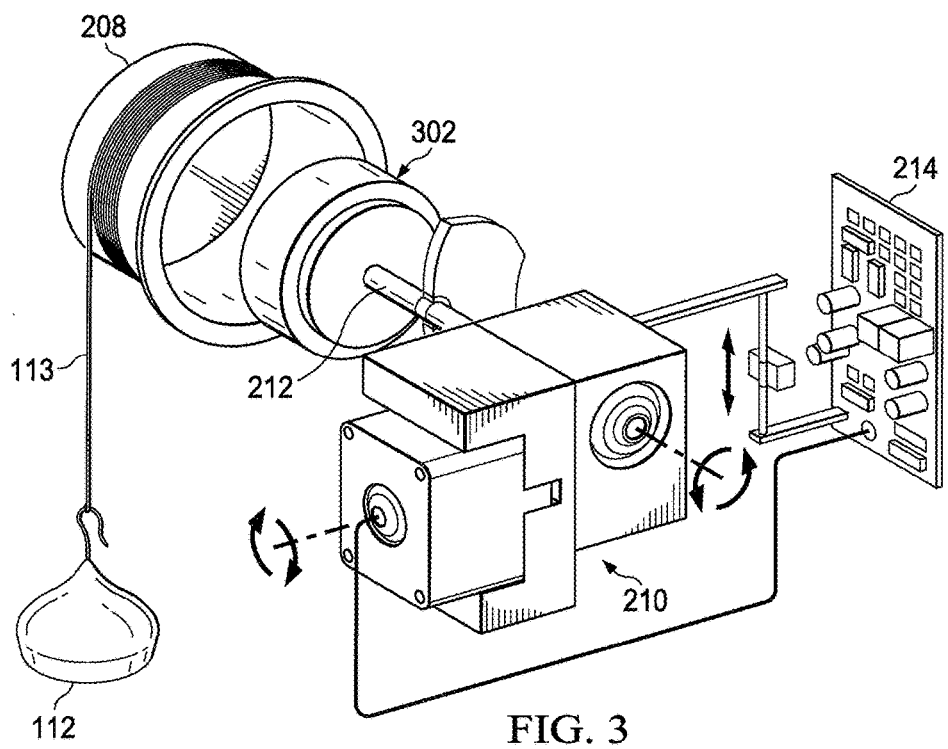

FIGS. 2 and 3 illustrate example servo gauges 110 for use in an inventory management system according to this disclosure. As shown in FIG. 2, one embodiment of the servo gauge 110 includes three compartments: a drum compartment 202, a drive compartment 204, and a power supply compartment 206. The drum compartment 202 includes a drum 208 on which the measuring wire 113 is wound. The drum 208 can be rotated in one direction by the drive compartment 204 to lower the displacer 112, and the drum 208 can be rotated in another direction by the drive compartment 204 to raise the displacer 112. The drum 208 includes any suitable structure for raising and lowering a displacer via rotation, such as a cylindrical-shaped object having precisely-machined grooves for receiving the measuring wire 113.

The drive compartment 204 includes a drive train 210, which imparts rotation to the drum 208 via a shaft 212. For example, the drive train 210 or shaft 212 could generate a magnetic field, and magnetic coupling can be used to convey torque between the shaft 212 and the drum 208. In these embodiments, no direct connection may be needed between the drum compartment 202 and the other compartments 204-206. However, other techniques for causing rotation of the drum 208 could be used, such as when the shaft 212 is physically connected to the drum 208. The drive train 210 includes any suitable structure for imparting rotation to a drum. In particular embodiments, the drive train 210 includes a stepper motor that causes the drum 208 to rotate in specified steps, meaning the drum 208 does not rotate freely but in defined amounts or "steps." Each step of the stepper motor should therefore impart a known amount of rotation to the drum 208. In these embodiments, since the drum 208 has a known diameter or circumference, the length of measuring wire 113 that is dispensed or collected during a single step rotation can be known with a high degree of certainty. However, other embodiments of the drive train 210 could also be used.

The drive compartment 204 also includes a measuring unit 214, which identifies the torque or other force induced on the drum 208 by the displacer 112 or other characteristic(s) of the measuring wire 113, shaft 212, or drum 208. The force induced on the drum 208 can be caused by the apparent weight of the displacer 112. For example, when the displacer 112 is dangling from the measuring wire 113, the measured torque is higher. When the displacer 112 is completely or partially submerged in the material 104, the measured torque is lower. The measuring unit 214 includes any suitable structure for measuring at least one characteristic of the servo gauge 110, such as a force transducer. As a particular example, the measuring unit 214 could identify the torque on the drum 208 by measuring the torque on the shaft 212.

A controller 216 uses measurements from the measuring unit 214 to (among other things) determine the surface level of material 104 in the tank 102, determine a location of one or more material interfaces in the tank 102, or determine a density of material 104 in the tank 102. For example, the controller 216 can cause the drive train 210 to lower the displacer 112. When the displacer 112 is completely or partially submerged, the controller 216 detects the lower torque measurements from the measuring unit 214. Since the controller 216 can track the number of rotations or other operations of the drum 208 and know the length of the measuring wire 113 that has been dispensed or collected, the controller 216 can identify the length of the measuring wire 113 that is between the drum 208 and the displacer 112 when the drop in torque is detected. That length can be used to identify the surface level of material 104 in the tank 102 or the position of a material interface.

The controller 216 includes any suitable structure for determining a level, density, or other characteristic(s) of material in a tank using a displacer. As particular examples, the controller 216 could include at least one processor, microprocessor, microcontroller, field programmable gate array, digital signal processor, or other processing or control device. Instructions and data used, generated, or collected by the controller 216 could be stored in at least one memory 217, which denotes any suitable volatile or non-volatile storage and retrieval device(s).

In this example, the drive compartment 204 further includes a user interface 218 and a network interface 220. The user interface 218 facilitates communication between the servo gauge 110 and an operator or other personnel. The user interface 218 could provide data from an operator to the controller 216, such as a command to initiate level or density measurements or a command to raise or lower the displacer 112. The user interface 218 could also allow the personnel to review measurement data generated by the servo gauge 110. The user interface 218 includes any suitable interface for interacting with one or more users, such as a keypad or keyboard and a display.

The network interface 220 facilitates the communication of data to or from the servo gauge 110. For example, the network interface 220 could receive measurements calculated by the servo gauge 110 and transmit the measurements to one or more external destinations (such as the monitoring system 114). The network interface 220 includes any suitable structure supporting wired or wireless communications, such as an Ethernet interface, an RF transceiver, or other wired or wireless interface.

The power supply compartment 206 includes a power supply 222, which provides operating power for the servo gauge 110. For example, the power supply 222 could provide power to various components of the drive compartment 204. Depending on the implementation, the power supply 222 may or may not supply power to the drum compartment 202. The power supply 222 includes any suitable structure for providing power, such as a battery, fuel cell, or solar cell.

FIG. 3 illustrates a specific implementation of the servo gauge 110 of FIG. 2. As shown in FIG. 3, the servo gauge 110 includes a magnetic coupler 302 that translates rotation of the shaft 212 into rotation of the drum 208. The use of magnetic coupling helps to provide fault isolation in the servo gauge 110, although as noted above other embodiments of the drive train 210 could be used.

In some embodiments, a measuring wire 113 used to raise and lower a displacer 112 of a servo gauge 110 often has to be very thin yet strong, reasonably flexible, and compatible with the material 104 in the tank 102 (such as by being resistant to corrosion). Stainless steel (AISI 316) is often used as the measuring wire 113, although metals like tantalum or HASTELLOY alloys can be used for chemical applications. Smaller diameters of the measuring wire 113 may be useful since the smaller diameters allow narrower grooves to be used in the drum 208, resulting in less travel of the measuring wire 113 over its measuring height.

Unfortunately, measuring wires 113 with smaller diameters often have a higher elasticity, which means that the measuring wires 113 can elongate more while under load compared to measuring wires 113 with smaller elasticity. For some servo gauge applications, such as where the displacer 112 is moved to remain at the surface of the material 104, the higher elasticity may be acceptable since the apparent displacer weight remains substantially constant during use. However, if the displacer 112 is submerged in material 104 during use, the higher elasticity of the measuring wire 113 becomes problematic since the loading on the measuring wire 113 can change drastically.

The different loadings on the measuring wire 113 at different times can cause different portions of the measuring wire 113 to be wound on the drum 208 with different forces or loads. These different forces or loads can cause different portions of the measuring wire 113 to elongate by different amounts. This can create errors in level measurements or other measurements captured by the servo gauge 110. The magnitude of the errors can depend on the wire loading under various conditions, the wire properties, and the tank height. This can be particularly problematic in situations where precise measurements are needed, such as in "custody transfers" and "weights and measures of oil" applications. This problem is also exacerbated when taller tanks 102 are used, which is currently the trend in some industries.

One way this type of problem could be alleviated involves the use of measuring wires 113 formed from more exotic materials having higher Young's modulus values, meaning the materials are more stiff and show less elasticity. However, the chemical compatibility of these wire materials with the materials stored in tanks 102 may be unknown or be more limited than conventional wire materials. These wire materials are also often more complex to handle in factories and in the field, may require larger drums in order to spool the measuring wires, and are typically more expensive.

In accordance with this disclosure, a compensation algorithm is used to compensate for effects caused by changes in the length of a measuring wire 113 of a servo gauge 110. The changes in the length of the measuring wire 113 include both elongation of the measuring wire 113 (such as due to more-than-expected tension on the measuring wire 113) and contraction of the measuring wire 113 (such as due to less-than-expected tension on the measuring wire 113). As described in more detail below, the compensation algorithm uses information from the control mechanism of the servo gauge 110 to measure the tension on the measuring wire 113. While the servo gauge 110 is moving the displacer 112 up or down, the compensation algorithm keeps track of the tension at which the measuring wire 113 is spooled onto the drum 208. The servo gauge 110 also measures the tension on the portion of the measuring wire 113 currently hanging off the drum 208. Using these measured tensions, the compensation algorithm is able to estimate the elongation or contraction of the measuring wire 113 and to generate or correct level measurements or other measurements based on the identified elongation or contraction.

In this way, the compensation algorithm allows more accurate measurements to be captured by the servo gauge 110. Moreover, because elongation or contraction of the measuring wire 113 can be estimated and used in servo gauge measurements, there is less need to use exotic materials for the measuring wire 113. In some cases, the compensation algorithm may allow the choice of the measuring wire's material to be based purely on chemical compatibility in an intended application. At the same time, the compensation algorithm may help to reduce factory operations or servo gauge costs by helping to simplify servo gauge production and allow usage of cheaper components.

In some embodiments, the compensation algorithm could be used continuously and automatically with a servo gauge 110. Also, the compensation algorithm could be implemented in any suitable manner, such as by using hardware or a combination of hardware and software/firmware instructions. As a particular example, the compensation algorithm could be implemented using software/firmware instructions that are stored in the memory 217 and executed by the controller 216 of the servo gauge 110 or that are stored in the memory 126 and executed by the processing device 124 of the monitoring system 114.

Additional details regarding specific implementations of the servo gauge compensation algorithm are provided below. Note that these details relate to specific implementations of the servo gauge compensation algorithm and that other implementations of the compensation algorithm could be used.

Although FIG. 1 illustrates one example of an inventory management system 100 having a servo gauge 110 and FIGS. 2 and 3 illustrate examples of servo gauges 110 for use in an inventory management system, various changes may be made to FIGS. 1 through 3. For example, a system could include any number of tanks, monitoring systems, servo gauges, pumps, valves, controllers, displays, user devices, or other components. Also, the makeup and arrangement of the inventory management system 100 are for illustration only. Components could be added, omitted, combined, subdivided, or placed in any other suitable configuration according to particular needs. As particular examples, the monitoring system 114 could be incorporated into the servo gauge 110, or the measuring unit 214 and the controller 216 could be combined into a single processing device or other functional unit. Further, while FIG. 1 illustrates one operational environment in which a servo gauge compensation algorithm can be used, this functionality could be used in any other suitable system. In addition, the specific form factors of various components shown in FIG. 3 are for illustration only.

Figure 4:
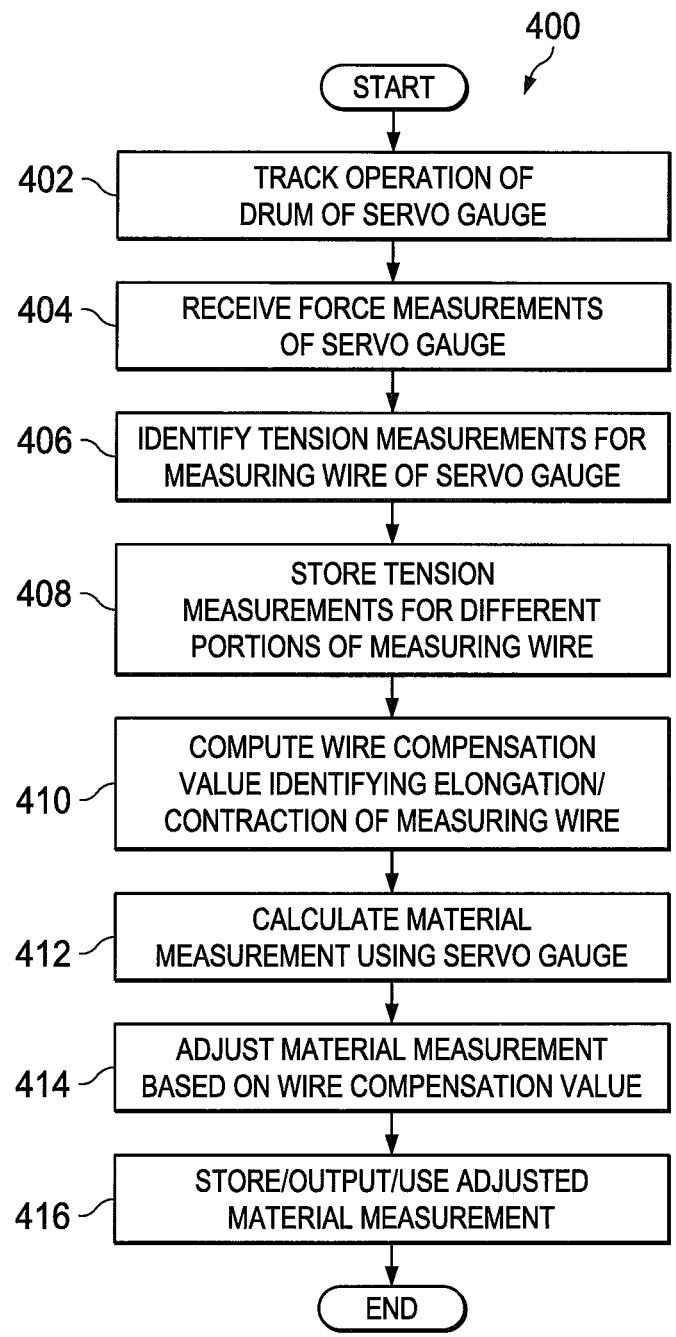
FIG. 4 illustrates an example method for wire length compensation in a servo gauge for an inventory management application according to this disclosure.

FIG. 4 illustrates an example method 400 for wire length compensation in a servo gauge for an inventory management application according to this disclosure. For ease of explanation, the method 400 shown in FIG. 4 is described with respect to the servo gauge 110 of FIG. 2 operating in the system 100 of FIG. 1. However, the method 400 could be used with any suitable servo gauge and in any suitable system.

As shown in FIG. 4, the operation of a drum in a servo gauge is tracked at step 402. This could include, for example, the controller 216 of the servo gauge 110 tracking the number of steps that the drive train 210 uses to rotate the drum 208 of the servo gauge 110. However, the controller 216 could track other ways in which the servo gauge 110 rotates the drum 208. The tracking of the drum 208 allows the controller 216 to identify when different segments of the measuring wire 113 are spooled onto or unspooled from the drum 208.

Force measurements related to the servo gauge are received or obtained at step 404. This could include, for example, the controller 216 receiving force measurements from the measuring unit 214. In some embodiments, the force measurements could identify the torque on the shaft 212 or drum 208 of the servo gauge 110.

Measurements of tension on the measuring wire are identified using the force measurements at step 406, and the tension measurements for different portions of the measuring wire are stored at step 408. This could include, for example, the controller 216 using the force measurements as the tension measurements or processing the force measurements in some way to generate the tension measurements. This could also include the controller 216 identifying the tension measurements for different segments of the measuring wire 113. The different segments of the measuring wire 113 could denote different unit lengths of the measuring wire 113 (such as different centimeter or meter segments of the measuring wire 113) or different revolutions of the drum 208 (each of which is associated with some segment of the measuring wire 113).

The tension measurements can be identified and stored as the measuring wire 113 is wound onto and unwound from the drum 208. As explained below, a memory management technique can be used such that the tension measurement for a segment of the measuring wire 113 is stored when that segment is wound onto the drum 208 and discarded when that segment is unwound from the drum 208. In some embodiments, if a segment of the measuring wire 113 has not yet been unwound from the drum 208 and then spooled back onto the drum 208, a default tension measurement could be stored in association with that segment of the measuring wire 113. For instance, the tension at which the measuring wire 113 is wound onto the drum 208 in a factory could be stored in the memory location for that segment.

A wire compensation value is calculated at step 410. This could include, for example, the controller 216 using at least some of the stored tension measurements to estimate an amount of wire elongation or contraction that has occurred with the measuring wire 113. Note that the amount of wire elongation or contraction could be expressed in various ways. For example, wire elongation or contraction could be expressed as an absolute amount of wire elongation or contraction that has occurred (given the tension measurements and properties of the measuring wire 113). Wire elongation or contraction could also be expressed as a relative amount of wire elongation or contraction that has occurred (given the tension measurements and properties of the measuring wire 113) compared to an expected amount of wire elongation or contraction.

A material measurement is calculated using the servo gauge at step 412 and adjusted using the wire compensation value at step 414. This could include, for example, the controller 216 calculating a surface level measurement or an interface level measurement of the material 104 in the tank 102 based on the amount of measuring wire 113 unspooled from the drum 208. This could also include the controller 216 adjusting the calculated material measurement using the wire compensation value to compensate for elongation or contraction of the measuring wire 113. Note that while shown as separate steps here, the material measurement calculation and adjustment could be combined into a single calculation or set of calculations, such as when the wire compensation value (or other value representing or based on the estimated amount of wire elongation or contraction) is incorporated directly into the calculation of the material measurement.

The material measurement is stored, output, or used in some manner at step 416. This could include, for example, the controller 216 displaying the adjusted material measurement on a local display, such as the user interface 218. This could also include the controller 216 providing the adjusted material measurement to the network interface 220 for transmission to the monitoring system 114, controller 118, display 120, or user device 122. The adjusted material measurement could be used to perform any other suitable functions.

The controller 216 in this example can help to compensate for elongation or contraction of the measuring wire 113 by taking into account both (i) the tensions on different segments of the measuring wire 113 currently wound around the drum 208 and (ii) the tension on the portion of the measuring wire 113 currently unwound from the drum 208. For example, a current force measurement from the measuring unit 214 can be used to identify the tension on the portion of the measuring wire 113 currently unwound from the drum 208. From this, the controller 216 could identify elongation or contraction of that portion of the measuring wire 113. Stored force measurements from the measuring unit 214 or stored default force measurements can also be used to identify the tensions on portions of the measuring wire 113 currently wound around the drum 208. From that, the controller 216 could identify an overall elongation or contraction of those portions of the measuring wire 113 currently wound around the drum 208. By taking into account those values, the controller 216 can more effectively identify the length of the measuring wire 113 currently unwound from the drum 208, helping to provide more accurate level measurements or other measurements.

Again, note that the wire compensation value could be expressed in various ways. In some embodiments, it may be assumed that the measuring wire 113 is wound around the drum 208 at a specific tension, such as a tension established in a factory. It may also be assumed that this tension permits some known level of wire elongation. The wire compensation value for this type of servo gauge 110 could be expressed as the difference between the actual elongation or contraction and the known level of wire elongation. Of course, other expressions of the wire compensation value, such as actual estimates of the wire elongation or contraction, could also be used.

In particular embodiments, the equation for Young's modulus can help to calculate the expected elongation or contraction of the measuring wire 113 as a function of the tension (force) on the measuring wire 113. This equation can be expressed as:

$$E = \frac{F \times L}{A \times \Delta L} \quad (1)$$

Here, E denotes the Young's modulus (such as in Pascals), F denotes the applied force (such as in Newtons), L denotes the original length of the measuring wire 113 (such as in meters), A denotes the cross-sectional area of the measuring wire 113 (such as in square meters), and $\Delta L$ denotes the change in length of the measuring wire 113 (such as in meters). This equation can be rewritten in order to identify the change in length of the measuring wire 113 as follows:

$$\Delta L = \frac{F \times L}{E \times A} \quad (2)$$

In some embodiments, the difference between an expected change in the measuring wire's length and an actual change in the measuring wire's length could be used as the wire compensation value for a specific segment of the measuring wire 113. In these embodiments, a wire compensation value $\Delta L_i$ for the $i^{th}$ segment of the measuring wire 113 could be expressed as:

$$\Delta L_i = \frac{(F_{meas} - F_{ref}) \times L}{E \times A} \quad (3)$$

where $F_{meas}$ denotes the measured tension (force) on that segment of the measuring wire 113 and $F_{ref}$ denotes a reference tension (force) for at least that segment of the measuring wire 113. In particular embodiments, the reference tension $F_{ref}$ could be equal for all segments of the measuring wire 113, although this need not be the case.

Wire compensation values could be calculated in this manner for different segments of the measuring wire 113, including one or more segments of the measuring wire 113 hanging from the drum 208 and one or more segments of the measuring wire 113 currently wound around the drum 208. The wire compensation values for the different segments could then be combined to create a final wire compensation value that is used to adjust a material measurement. In some embodiments, the final wire compensation value $Wire_{corr}$ could be expressed as:

$$Wire_{corr} = \sum_{i=1}^{n} \Delta L_i + \Delta L_{free} \quad (4)$$

where n denotes the number of segments of the measuring wire 113 wound around the drum 208, and $\Delta L_{free}$ denotes a wire compensation value for the segment(s) of the measuring wire 113 hanging from the drum 208 (and not wound around the drum 208).

Although FIG. 4 illustrates one example of a method 400 for wire length compensation in a servo gauge for an inventory management application, various changes may be made to FIG. 4. For example, while shown as a series of steps, various steps in FIG. 4 could overlap, occur in parallel, occur in a different order, or occur any number of times. Also, the wire length correction described in FIG. 4 could be combined with one or more corrections related to other aspects of a servo gauge, such as temperature corrections related to the drum 208, temperature corrections of the "in tank" measuring wire, temperature corrections of the magnetic coupling, and density corrections for the immersion of the displacer 112. Two specific examples of additional types of corrections that could be combined with the wire length correction of FIG. 4 are described in U.S. patent application Ser. No. 14/875,325 filed on Oct. 5, 2015 and entitled "DENSITY COMPENSATION FOR ELECTROMECHANICAL LIQUID LEVEL GAUGES" and U.S. patent application Ser. No. 15/207,693 filed on Jul. 12, 2016 and entitled "AUTOMATIC PRESSURE CORRECTION FOR LEVEL GAUGES IN STORAGE TANKS."

FIGS. 5 and 6A through 6C illustrate an example memory management technique for supporting wire length compensation in a servo gauge for an inventory management application according to this disclosure. For ease of explanation, the memory management technique shown here is described with respect to the servo gauge 110 of FIG. 2 operating in the system 100 of FIG. 1. However, the memory management technique could be used with any suitable servo gauge and in any suitable system.

Figure 5:
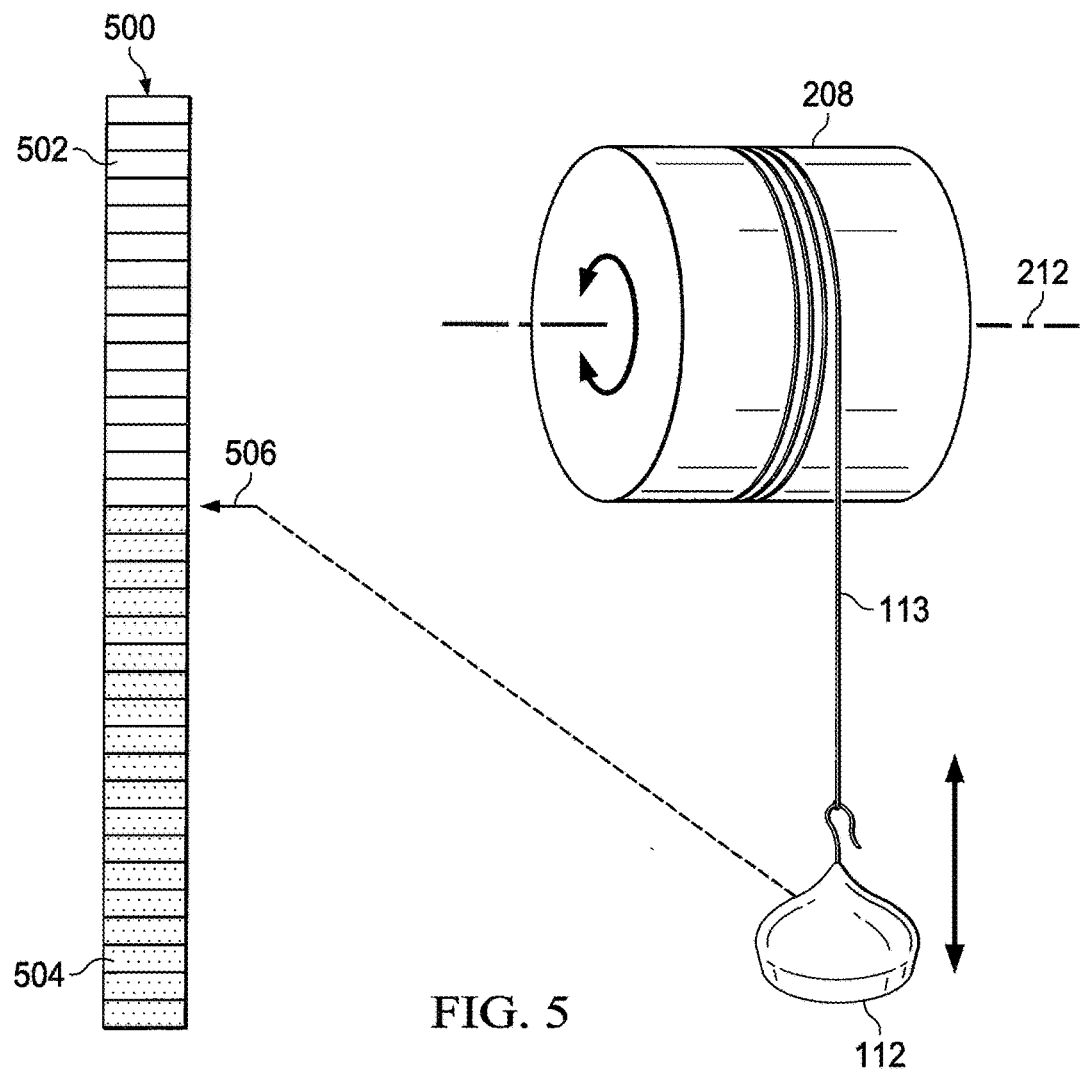
FIGS. 5 and 6A through 6C illustrate an example memory management technique for supporting wire length compensation in a servo gauge for an inventory management application according to this disclosure.

As shown in FIG. 5, a memory 500 includes a number of memory locations 502. The memory 500 could, for example, denote a portion of the memory 217 in the servo gauge 110 or the memory 126 in the monitoring system 114. Each memory location 502 can be used to store a tension measurement 504 associated with a different segment of the measuring wire 113. The number of memory locations 502 can be based on the number of segments of the measuring wire 113, and the number of segments of the measuring wire 113 can depend on number of the unit lengths forming the measuring wire 113 or the number of drum revolutions required to unwind the measuring wire 113 completely.

As segments of the measuring wire 113 are unwound from the drum 208, the tension measurements 504 in the memory locations 502 for those segments of the measuring wire 113 can be discarded or not used any longer. In this example, a pointer 506 is associated with a current location of the displacer 112. Memory locations 502 above the pointer 506 can contain discarded or unused tension measurements 504 that may not be used to identify wire compensation values. Memory locations 502 below the pointer 506 can contain tension measurements 504 that may continue to be used to identify wire compensation values.

Initially, all memory locations 502 in the memory 500 could include default tension measurements 504, such as measurements 504 taken while the measuring wire 113 is being wound around the drum 208 in a factory. The default tension measurements 504 may or may not be equal. As the measuring wire 113 is unwound, the memory locations 502 for the unwound segments can be discarded, while the remaining memory locations 502 continue to contain measurements 504 for unwound segments of the measuring wire 113. As the measuring wire 113 is wound back up, the memory locations 502 for the newly rewound segments can be filled with new tension measurements 504 and used in subsequent wire compensation value computations.

Figure 6C:
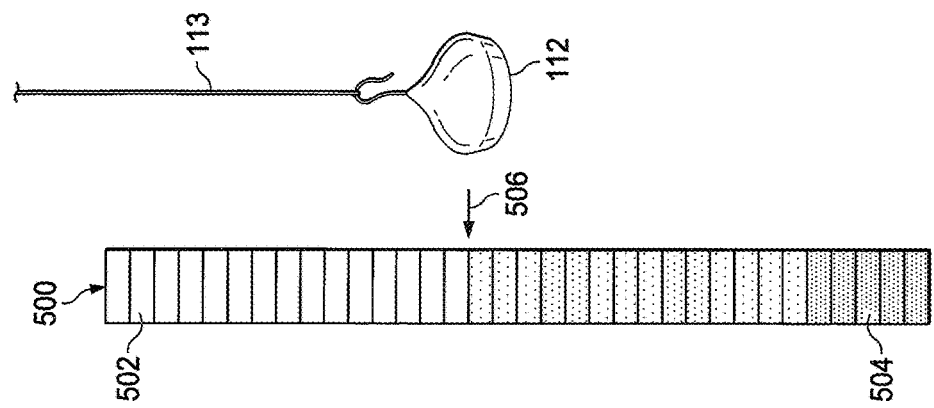
Figure 6B:
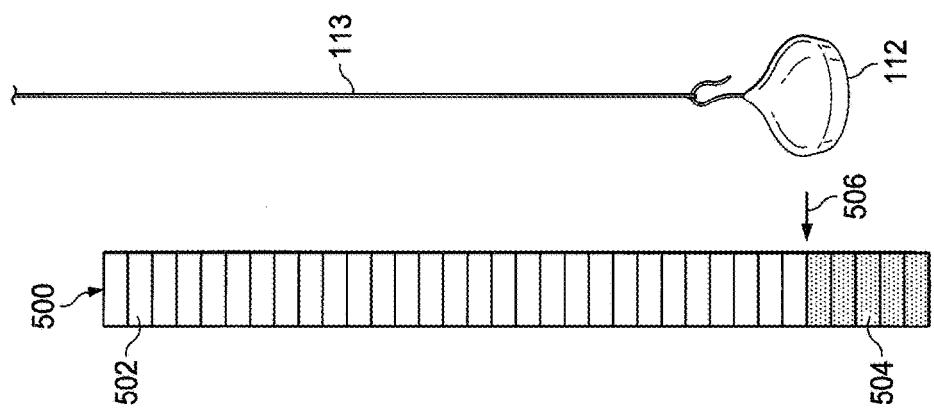
Figure 6A:
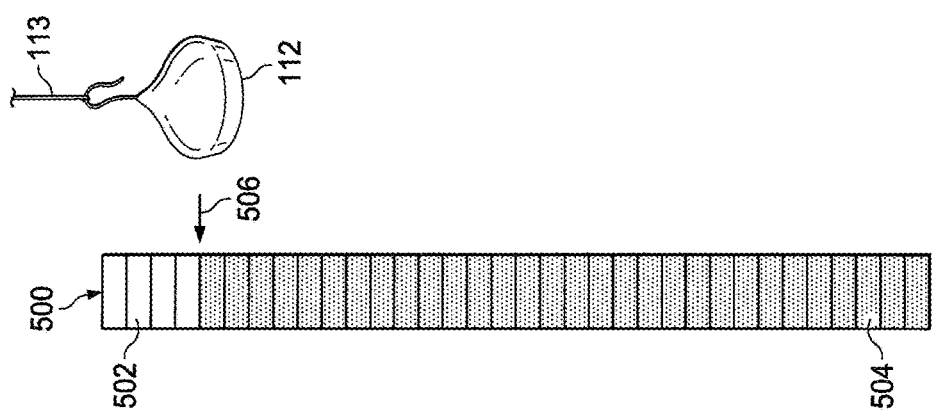

An example of this is shown in FIGS. 6A through 6C. In FIG. 6A, the displacer 112 is at a relatively high location, and most memory locations 502 contain tension measurements 504. In this example, the used memory locations 502 are shaded similarly to denote that the tension measurements 504 are generally equal, which could occur when the servo gauge 110 is first being used and the stored tension measurements 504 are default or factory-defined values.

In FIG. 6B, the displacer 112 is moved down, and the pointer 506 is moved down. This indicates that various tension measurements 504 contained in the memory 500 can be discarded or no longer used. As a result, only a handful of the tension measurements 504 may remain valid and used to calculate wire compensation values. The discarded values could simply be ignored or overwritten, such as with a value of zero.

In FIG. 6C, the displacer 112 is moved back up, and the pointer 506 is moved up, indicating that new tension measurements 504 are being added into memory locations 502. The new tension measurements 504 are shown here as having different shadings, indicating that the new tension measurements 504 need not be generally equal. This can occur, for example, when the displacer 112 is raised and different tensions are applied on the measuring wire 113 at different times.

To calculate a final wire compensation value for the current location of the displacer 112 in FIG. 6C, the controller 216 could use the equations described above. As an example, for each memory location 502 at or below the pointer 506 in FIG. 6C, the controller 216 could use Equation (3) above to calculate a length correction for the wire segment associated with that memory location 502. The controller 216 could then use Equation (4) above to combine the length corrections for the segments into a final length correction for the current measurement. The portion of the measuring wire 113 hanging from the drum 208 may or may not have a value stored in the memory 500. If not stored in the memory 500, the controller 216 could use the current output of the measuring unit 214 for the portion of the measuring wire 113 hanging from the drum 208.

In this way, the compensation algorithm described above could be implemented using a limited amount of memory. Rather than having to store a large number of data measurements, the tension measurements for the measuring wire 113 in some embodiments can be limited to one measurement per measuring wire segment. Of course, other compensation calculations that use more measurements could also be used.

Although FIGS. 5 and 6A through 6C illustrate one example of a memory management technique for supporting wire length compensation in a servo gauge for an inventory management application, various changes may be made to FIGS. 5 and 6A through 6C. For example, the number of memory locations 502 could vary depending on the implementation. Also, other techniques could be used to store or use the tension measurements for wire length compensation.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for wire length compensation in a servo gauge, the method comprising:
   measuring tensions on a measuring wire coupled to a displacer of the servo gauge, the servo gauge configured to raise and lower the displacer using a drum around which the measuring wire is wound, wherein different measured tensions are associated with different segments of the measuring wire, said different segments include different portions of the measuring wire having a common unit length and different portions of the measuring wire released during different revolutions of the drum; and
   calculating or adjusting a measurement associated with material in a tank using the measured tensions to account for a change in a length of the measuring wire utilizing (i) the tensions on different segments of the measuring wire currently wound around the drum and (ii) the tension on the portion of the measuring wire currently unwound from the drum.

2. The method of claim 1, wherein calculating or adjusting the measurement comprises:
   calculating one or more first length adjustments for one or more segments of the measuring wire that are wound around the drum;
   calculating one or more second length adjustments for one or more other segments of the measuring wire that are unwound from the drum; and
   combining the first and second length adjustments to identify a final length adjustment.

3. The method of claim 2, wherein calculating or adjusting the measurement further comprises:
   adjusting the measurement associated with the material in the tank using the final length adjustment.

4. The method of claim 2, wherein each of the first length adjustments is based on a difference between (i) the measured tension associated with one segment of the measuring wire wound around the drum and (ii) a reference tension.

5. The method of claim 1, wherein measuring the tensions on the measuring wire comprises measuring torques placed on the drum or on a shaft associated with the drum.

6. The method of claim 1, wherein the measurement associated with the material in the tank comprises one of:
   a measurement of a surface level of the material in the tank;
   a measurement of a level of an interface between different materials in the tank; and
   a density of the material in the tank.

7. The method of claim 1, further comprising:
   storing or outputting the calculated or adjusted measurement.

8. An apparatus for wire length compensation in a servo gauge, the apparatus comprising:
   a drum configured to be rotated in order to raise and lower a displacer within a tank;
   a measuring wire having different segments coupling the drum and the displacer wherein, said different segments include different portions of the measuring wire having a common unit length and different portions of the measuring wire released during different revolutions of the drum;
   a sensor configured to measure tensions on the measuring wire such that different measured tensions are associated with different segments of the measuring wire; and
   a controller configured to calculate or adjust a measurement associated with material in the tank using the measured tensions to account for a change in a length of the measuring wire utilizing (i) the tensions on different segments of the measuring wire currently wound around the drum and (ii) the tension on the portion of the measuring wire currently unwound from the drum.

9. The apparatus of claim 8, wherein, to calculate or adjust the measurement, the controller is configured to:
   calculate one or more first length adjustments for one or more segments of the measuring wire that are wound around the drum;
   calculate one or more second length adjustments for one or more other segments of the measuring wire that are unwound from the drum; and
   combine the first and second length adjustments to identify a final length adjustment.

10. The apparatus of claim 9, wherein, to calculate or adjust the measurement, the controller is further configured to adjust the measurement associated with the material in the tank using the final length adjustment.

11. The apparatus of claim 9, wherein each of the first length adjustments is based on a difference between (i) the measured tension associated with one segment of the measuring wire wound around the drum and (ii) a reference tension.

12. The apparatus of claim 8, wherein the sensor is configured to measure torques placed on the drum or on a shaft associated with the drum.

13. The apparatus of claim 8, wherein the measurement associated with the material in the tank comprises one of:
a measurement of a surface level of the material in the tank;
a measurement of a level of an interface between different materials in the tank; and
a density of the material in the tank.

14. A non-transitory computer readable medium containing instructions for wire length compensation in a servo gauge that, when executed by at least one processor, cause the at least one processor to:
obtain tensions on a measuring wire coupled to a displacer of a servo gauge, the servo gauge configured to raise and lower the displacer using a drum around which the measuring wire is wound, wherein different measured tensions are associated with different segments of the measuring wire said different segments include different portions of the measuring wire having a common unit length and different portions of the measuring wire released during different revolutions of the drum; and
calculate or adjust a measurement associated with material in a tank using the measured tensions to account for a change in a length of the measuring wire utilizing (i) the tensions on different segments of the measuring wire currently wound around the drum and (ii) the tension on the portion of the measuring wire currently unwound from the drum.

15. The non-transitory computer readable medium of claim 14, wherein the instructions that when executed cause the at least one processor to calculate or adjust the measurement comprise:
instructions that when executed cause the at least one processor to:
calculate one or more first length adjustments for one or more segments of the measuring wire that are wound around the drum;
calculate one or more second length adjustments for one or more other segments of the measuring wire that are unwound from the drum; and
combine the first and second length adjustments to identify a final length adjustment.

16. The non-transitory computer readable medium of claim 15, wherein the instructions that when executed cause the at least one processor to calculate or adjust the measurement further comprise:
instructions that when executed cause the at least one processor to adjust the measurement associated with the material in the tank using the final length adjustment.

17. The non-transitory computer readable medium of claim 15, wherein each of the first length adjustments is based on a difference between (i) the measured tension associated with one segment of the measuring wire wound around the drum and (ii) a reference tension.

18. The non-transitory computer readable medium of claim 14, wherein the obtained tensions on the measuring wire comprise measured torques placed on the drum or on a shaft associated with the drum.

* * * * *